(No Model.)

R. N. TUCKER.
REPAIRING PLUG AND PATCH FOR PNEUMATIC TIRES.

No. 598,650. Patented Feb. 8, 1898.

Witnesses:
Raphael Netter
James M. Catlow

Richard N. Tucker, Inventor
By Robt. F. Gaylord
Atty

UNITED STATES PATENT OFFICE.

RICHARD N. TUCKER, OF WEST HOBOKEN, NEW JERSEY.

REPAIRING PLUG AND PATCH FOR PNEUMATIC TIRES.

SPECIFICATION forming part of Letters Patent No. 598,650, dated February 8, 1898.

Application filed January 18, 1897. Serial No. 619,542. (No model.)

*To all whom it may concern:*

Be it known that I, RICHARD N. TUCKER, a citizen of the United States, residing at West Hoboken, in the county of Hudson and State of New Jersey, have invented a certain new and useful Improvement in Repairing Plugs and Patches for Pneumatic Tires, of which the following is a specification, reference being had to the drawings accompanying and forming a part of the same.

The invention relates to a new method and device for closing holes or punctures made in tubes, such as pneumatic tires used on bicycles or other vehicles, or other hollow articles only available for repair from the outside.

The invention consists generally of a plug carrying a hollow patch composed of two disks united at their edges and capable of extension to have a size approximately that of the plug or so as to permit the insertion of same through the puncture of and into the tube, and constructed so that when freed of extension pressure to return to their original shape or to conformation with the tube, and of the method of using such a plug and patch.

Figure 1:
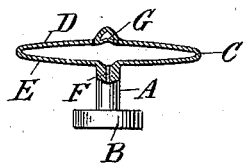
Figure 2:
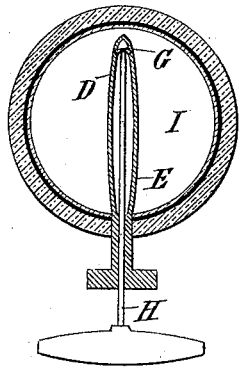
Figure 3:
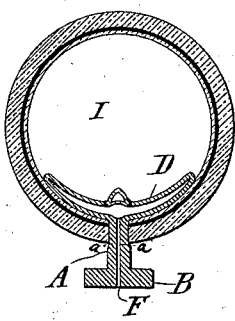
Figure 4:
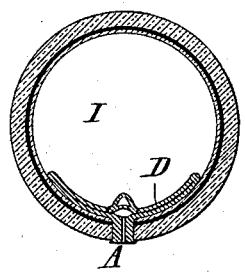

Referring to the drawings, Figure 1 represents a plug and patch embodying my invention. Fig. 2 represents the same after having been inserted through a puncture of a bicycle-tire and before the same has been allowed to collapse or return to its original form. Fig. 3 represents the same after it has been allowed to return to its original form as limited by the tire in which it has been placed. Fig. 4 represents the final form of the patch in the plug after the tire has been reinflated.

Referring to the views in detail, A represents what I designate as the "plug." In other words, it is the plug that is designed to fill the puncture or hole that may be made in the bicycle-tire. This plug carries at its outer end a head B, which is for the convenience of manipulating the plug and inserting the same through the tire. C represents what I designate as the "patch," which is composed of the two circular disk-like parts D and E, joined at their edges. These parts A D are preferably made in one single structure, as indicated in Fig. 1, and ordinarily would be composed of rubber, gutta-percha, or some similar elastic material, though the separate parts may be composed of other or different materials in accordance with the functions of the same as herein expressed. Through the plug A is a central axial passage F, and the upper disk D of the patch may carry or have embedded therein a metallic disk or cup G for preventing the piercing of this disk by the extension or expansion needle to be hereinafter described.

In applying this plug and patch to a tire the following steps are taken, it being assumed, for example, that it is desired to close a puncture or rupture of a pneumatic tire for vehicles of rubber or other material: If the puncture be too small relatively to the size of the plug A it may be made slightly larger. The operator then takes a wire, needle, or similar device H, and inserting it through the hole F of the plug of form shown in Fig. 1, and so that the same bears against the disk D, and preferably against the resistant cup G of the same, expands or elongates the disks D and E, so that they become of cylindrical form, practically as shown at I in Fig. 2, or, in other words, of size about that of the aperture or puncture to be closed in the tire. When the patch is thus drawn out or extended, it is thrust through the puncture, as shown in Fig. 2, and so that the plug A is drawn into the puncture of the tire. Then the needle is withdrawn from the plug and the disks allowed to collapse or return as nearly as possible to their original form, which form, in view of their bearing upon the inner walls of the tire, will be about as shown in Fig. 3. The head B of the plug and so much of the plug as unnecessarily protrudes from the tire is cut off, as along the dotted lines *a a* in Fig. 3.

At the time of inserting the plug and the extended or elongated patch-disks of the same, as shown in Fig. 2, cement or other adhesive material may be properly applied to the said disk E and to the tire, and will be carried into the space of the tire, so that when the disks coming to form, as shown in Fig. 3, the disk E will apply such cement to the inner walls of the tire and become fixed thereto.

After inflation of the tire the patch and plug will come to position, practically as shown in Fig. 3, thus filling the puncture and fully covering seams, cracks, or other extensions of the puncture by the patch and particularly by the disk E.

The essential feature of this invention is that of providing and using a plug with a double and extensible patch of construction, such that the patch can be extended or elongated into tube form or to have a thickness not essentially greater than that of the plug and capable when released or after extension to collapse or fall back into practically its original form, except as restricted by the inner walls of the tire or other hollow article.

What is claimed as new is—

1. As a new article of manufacture for closing a puncture in a tube or cycle-tire, which consists of two flexible disks secured together at their edges, and a plug one end of which is fixed to one of the disks, and the other end enlarged, substantially as set forth.

2. As a new article of manufacture a plug A bearing the head B, the flexible disk E secured to said plug, and the disk D secured at its edges to the disk E, substantially as and for the purpose set forth.

3. As a new article of manufacture, the plug A carrying the two flexible disks D and E secured to each other at their peripheral edges, the former of which disks is provided with the cap G, in combination with a needle or similar tool H, substantially as and for the purpose set forth.

4. As a new article of manufacture for closing a puncture in a cycle-tire consisting of a plug A, bearing the head B, pierced at F, the flexible disk E, secured to said plug, and the disk D secured at its edges to the disk E, as set forth.

RICHARD N. TUCKER.

Witnesses:
IRVING W. TEEPLE,
R. F. GAYLORD.